May 5, 1970  L. R. BAESSLER  3,510,765
METHOD AND APPARATUS FOR GATING VARIABLY RECURRENT WAVEFORMS
Filed July 31, 1967
4 Sheets-Sheet 2
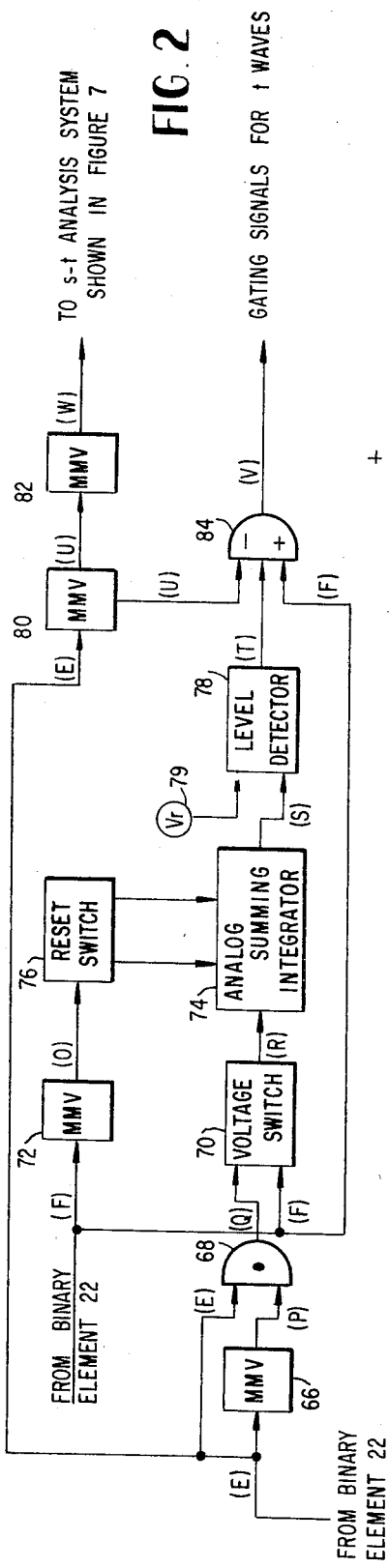
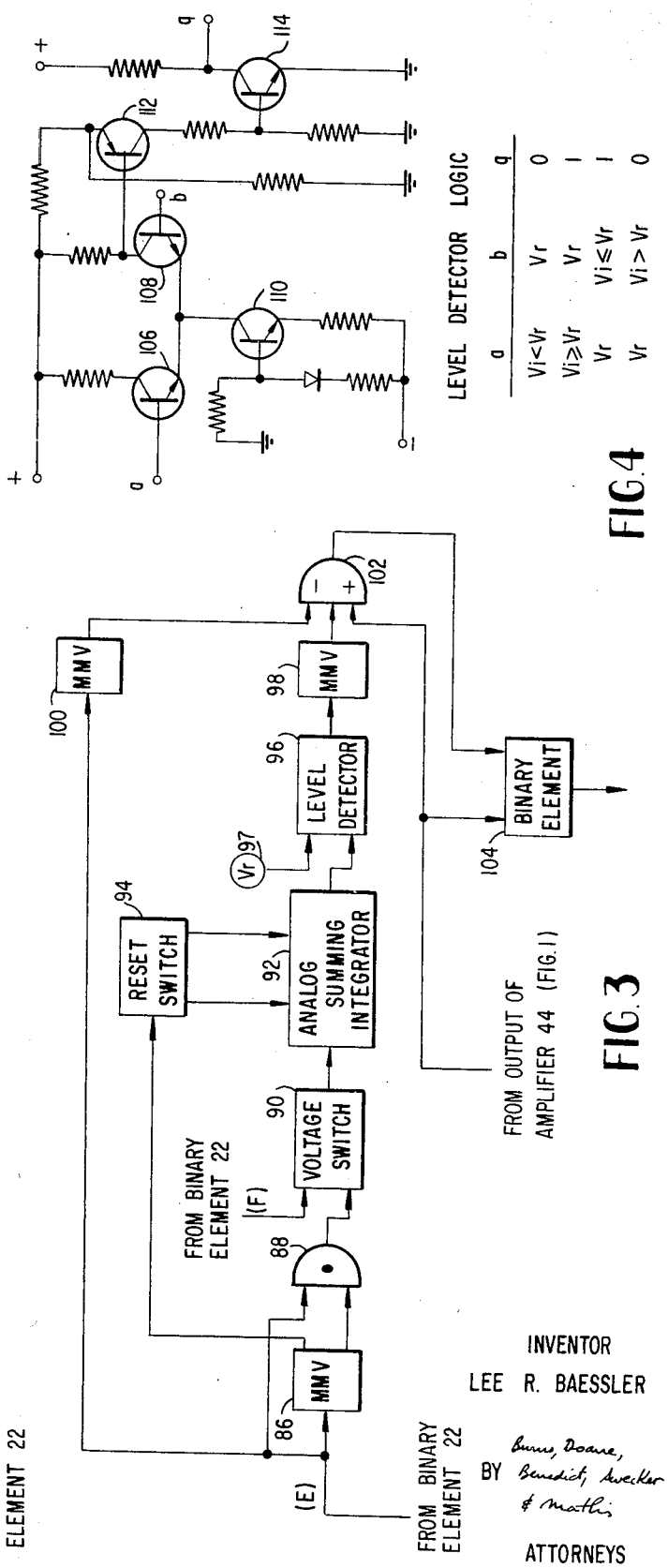
INVENTOR
LEE R. BAESSLER
BY Burns, Doane,
Benedict, Swecker
& Mathis
ATTORNEYS

VOLTAGE SWITCH LOGIC

| c | d | e |
|---|---|---|
| 0 | 0 | 0 |
| 0 | 1 | -V |
| 1 | 0 | +V |
| 1 | 1 | NA |

RESET SWITCH LOGIC

| IN | OUT | |
|---|---|---|
| 0 | INTEGRATOR | OPERATES |
| 1 | INTEGRATOR | RESETS |

INVENTOR
LEE R. BAESSLER

BY Burns, Doane, Benedict,
Swecker & Mathis

ATTORNEYS

May 5, 1970          L. R. BAESSLER          3,510,765

METHOD AND APPARATUS FOR GATING VARIABLY RECURRENT WAVEFORMS

Filed July 31, 1967                               4 Sheets-Sheet 4

INVENTOR
LEE R. BAESSLER

BY *Burns, Doane, Benedict, Swecker & Mathis*

ATTORNEYS

United States Patent Office 3,510,765
Patented May 5, 1970

3,510,765
METHOD AND APPARATUS FOR GATING VARIABLY RECURRENT WAVEFORMS
Lee R. Baessler, Torrance, Calif., assignor, by mesne assignments, to Humetrics Corporation, a corporation of Delaware
Filed July 31, 1967, Ser. No. 657,102
Int. Cl. G04f 9/00
U.S. Cl. 324—68                                                                37 Claims

ABSTRACT OF THE DISCLOSURE

The invention is directed to method and apparatus for selectively gating and evaluating sub-portions in individual cycles of a variable recurrent wave such as an electrocardiac signal. In distinction to attempting to subdivide such a variably recurrent signal in accordance with a running average rate, the present invention provides a measure of a preceding cycle time duration for setting desired gating periods to be applied in the immediately succeeding cycle for gating and measurement or evaluation, but inhibits such measurement should the duration of the succeeding cycle vary beyond preselected limits from the duration of the antecedent cycle.

FIELD OF THE INVENTION

This invention relates to the analysis of electrical waveforms and more particularly to the analysis of selected portions of variable recurrence electrical waveforms.

The analysis of electrical waveforms having recurrent voltage levels is presently employed in many environments, and has particular importance in such fields as physiological testing, seismic exploration and structural or machine vibrational analysis. For instance, in electrocardiography wherein recurrent electrical signals are derived from electrodes placed upon the body of a patient, signal gating techniques have been developed for analyzing selected portions of each signal recurrence sequence. A detailed disclosure of the selective gating of an electrocardiographic waveform may be found in the co-pending patent application, Ser. No. 500,122, entitled: "Method and Apparatus for Automatic Screening of Electrocardiac Signals," by Harvey F. Glassner, Clinton O. Jorgensen, and Lee R. Baessler, filed Oct. 21, 1965.

Problems have heretofore been experienced in the use of signal gating techniques wherein the rate of signal recurrence is unstable, as variations from a normal rate of recurrence often produce undesirable results in signal gating accuracy. In electrocardiac testing, for example, the cardiac rate is known to be subject to wide variations from patient to patient, as well as with respect to a single patient under varying conditions. Hence, without means to vary the positions of the electrocardiac timing gates in response to variations in cardiac rate, erroneous classifications of the normalcy of a patient's heart may result.

DESCRIPTION OF THE PRIOR ART

Rate compensation apparatus has been heretofore developed in order to vary the durations and positions of timing gates in accordance with changes in the rate of recurrence of the electrical signal. Previous cardiac rate compensation circuitry has included capacitive averaging circuitry for producing an output voltage varying in magnitude in accordance with variations of the "running average" of the cardiac rate. Timing gates may then be applied to the electrocardiac wave as a function of the output voltage.

While "running average" circuitry and other circuitry heretofore developed for variable rate compensation of timing gates have been found to operate well when the recurrence rate is substantially constant or slowly varying, such circuitry has been found to be less than totally satisfactory with respect to extreme or sudden variations in the signal recurrence rate. The relatively slow response of previous rate compensation systems has thus prevented accurate tracking under such conditions as moderate cardiac arrhythmias. Further, previous rate compensation systems have sometimes caused erroneous indications to be presented as a result of sudden rate variances.

SUMMARY OF THE INVENTION

The invention deals with variably recurrent electrical waveforms. Such waveforms comprise a recognizable sequence of voltage variations, or waveform pattern, which are repeated with variation in the period of cyclic recurrence. Such waveforms may be encountered in a sequence of signal levels supplied by binary type generators, or from such signals read out from a recording medium in which the read-out process imposes a variable recurrence rate or jitter thereupon. Primary examples of such signals are physiologically generated voltage patterns, such as the electrocardiac signal or an electrical version of the heart sound signal.

The analysis of these signals frequently requires electrical measurements of a particular phase sector of the voltage pattern. For instance, assuming, as is usually the case, that a reference phase position may be identified in each successive cycle, the time period between successive reference phase positions would represent the period of the phenomena, and in accordance with normal electrical practice, this is divided into the 360 degree reference system. It might be desired, for instance, to evaluate the signal by electrical measurements in the phase sector between 100 and 125 degrees. With a constant repetition rate, a gating system using uniform timing signals is entirely practical. On the other hand, the present invention involves such analysis where the time duration of successive signal cycles may become quite erratic. While over a period of a multiplicity of cycles, there may well be a definite average frequency of recurrence, none or few of the individual cycles may conform to the average period of the group. The present invention contemplates performing the desired analysis by effectively measuring the time duration of a selected cycle, and in dependency thereon, defining gating sectors for the immediately succeeding cycle during which gated portions of the succeeding cycle are individually transmitted to electrical measurement circuits for evaluation, and then effectively measuring the duration of the succeeding cycle to ascertain whether its length conformed sufficiently to the expected evaluation based on the antecedent cycle. If the succeeding cycle is found so to conform, the measurements performed on the phase sector characteristics of the succeeding waves are indicated or otherwise employed; but if the succeeding cycle period deviates from the expected value, utilization of the measurements is inhibited to avoid erroneous results. In the system of the invention, the process is cyclically repeated so that the system successively determines the period of a cycle and, in accordance with this determination, performs the desired measurements and evaluates the accuracy of the succeeding cycle, and then, on the third succeeding cycle, again evaluates the cycle duration for measurements or gating of the fourth cycle.

It is therefore a general object of the present invention to provide a method and apparatus for rapidly and accurately analyzing predetermined portions of a variably recurrent signal while automatically compensating the analysis for variations in the rate of recurrence.

The instant invention provides a method and apparatus for analyzing selected recurrent portions of a waveform in dependency on the recurrence rate comprising circuitry for generating pulses representative of the recurrence rate of first voltage levels for providing reference phase information. Integrating circuitry is provided for generating a signal in dependency on the pulses having characteristics indicating the respective occurrence of selected ones of second voltage levels. Sensing circuitry generates gating signals for the analysis of selected ones of the second voltage levels in response to the characteristics of the signal. Logic circuitry is provided to indicate the variations in the recurrence rate and also to inhibit analysis of the second voltage levels during rate variations outside the desired range of values.

BRIEF DESCRIPTION OF THE DRAWINGS

The invention and its many advantages may be further understood by reference to the following detailed description illustrated in the accompanying drawings, in which:

FIG. 2 is a block diagram of a portion of the present rate compensation circuitry;

FIG. 3 is a block diagram of rate responsive inhibition circuitry;

FIG. 4 is a schematic diagram of the level detector utilized in the present invention, along with the logic operation table;

DESCRIPTION OF THE PREFERRED EMBODIMENT

Figure 1:
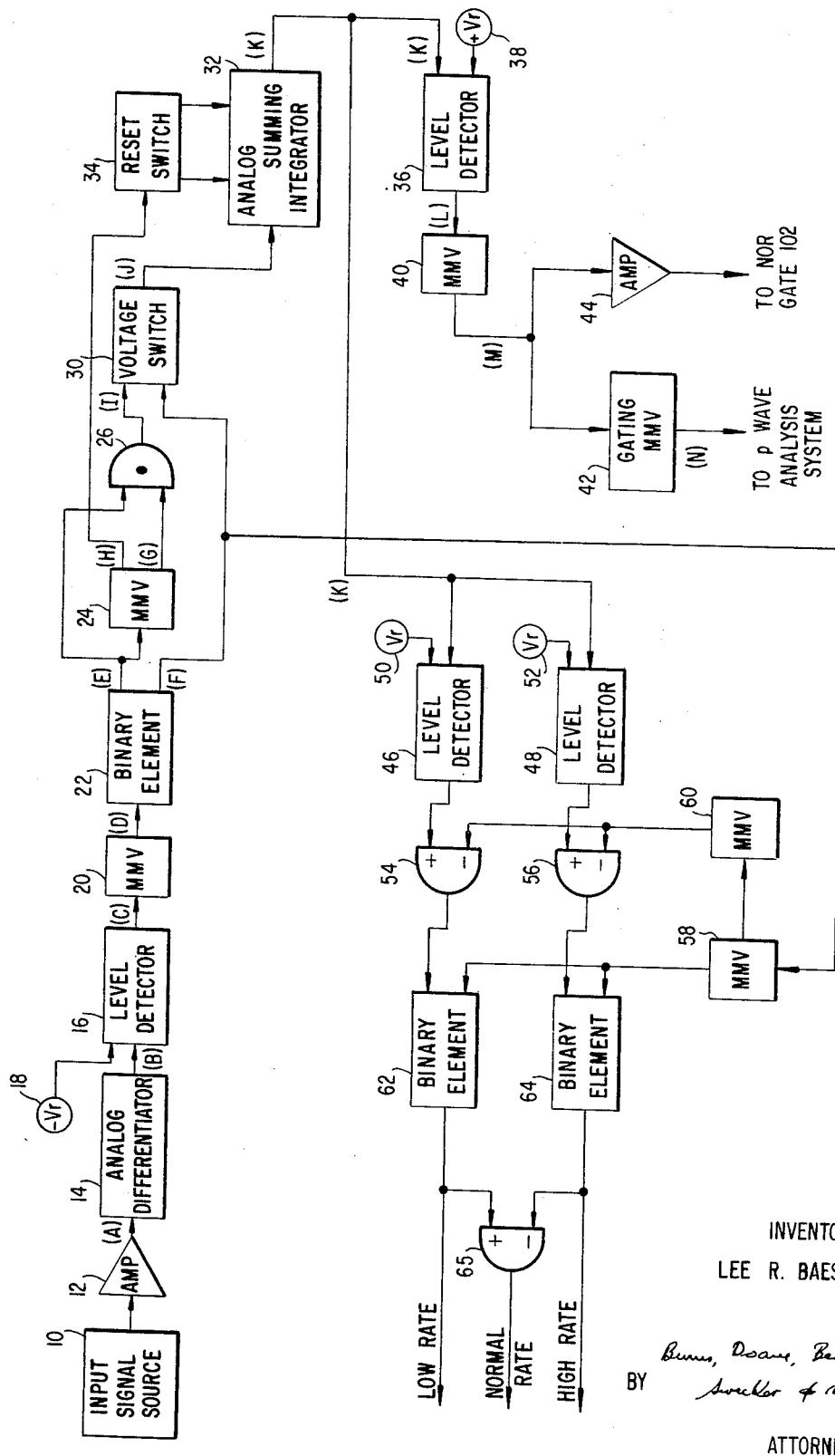
FIG. 1 is a block diagram of rate compensation and indication circuitry according to the present invention.

Referring to FIG. 1, the input to the present invention is provided by an input source 10, which, for instance, may comprise a plurality of electrocardiac electrodes placed in a conventional manner on a patient's body. It will, of course, be understood that other input sources may be utilized in connection with the present system, such as other sources of physiological waveforms, vibrational wave sources, seismic wave receivers, and the like.

The input wave is amplified by an amplifier 12 and the resulting wave, shown in solid line at FIG. 8A, is applied to the input of an analog differentiator 14, which provides indications of voltage peaks of the wave for accurate triggering of subsequent circuitry. The differentiated wave, shown in solid line at FIG. 8B, is applied to one input of a level detector 16, with a negative constant reference voltage from source 18 being applied to the second input of the level detector 16. As will be later described in detail, level detector 16 compares the voltage level of the two inputs and produces a high output signal, shown in solid line at FIG. 8C, only when the amplitude of the differentiated wave B exceeds the magnitude of the reference voltage. The negative portion of wave B is employed to operate the level detector 16.

The resulting voltage pulses C produced by the level detector 16 are fed to a monostable multivibrator 20 which in response produces positive output pulses D having predetermined durations. The output pulses D are applied to a binary element 22 of a conventional design which produces two binary output signals E and F having alternating voltage states of opposite polarities. Each of the binary signals changes voltage states in response to the leading edges of the output pulses D. The first binary signal E is fed to the inputs of the multivibrators 24 and the AND gate 26.

Monostable multivibrator 24 produces two output pulses H and G having durations substantially less than the durations of the alternating voltage states of the binary output signal E. The output pulses H and G have equal time durations but opposite polarities. The output pulses G are fed to the input of the AND gate 26, in association with the first binary signal E from the binary element 20. The AND gate 26 is of a conventional construction and provides an output signal I having a voltage level proportional to the smallest voltage magnitude presented by the signals E and G.

The signals F and I are fed to the inputs of the voltage switch 30 which provides an output J having a positive voltage in response to a high voltage signal applied to one of the two inputs, and a negative voltage if a high voltage magnitude is applied to the other input. The voltage switch 30 provides no output voltage if no voltage level of a high magnitude is applied to either of the inputs. The specific circuitry of the voltage switch 30 will be subsequently described in greater detail.

The output of the voltage switch 30 is applied to an input of the analog summing integrator 32. The integrator 32 may be of a conventional design, wherein capacitive elements provide a continuous linear integration of the input signal.

The second series of output pulses H from the monostable multivibrator 24 is presented to the input of a reset switch 34, which in response to each pulse electronically shorts out the integrating capacitance of the analog summing integrator 32 in order to reset the voltage of integrator 32 to zero. The specific circuitry of the reset switch 34 will be hereinafter described.

The integrated output K from the summing integrator 32 is applied to a level detector 36, to be later further described, which produces an output signal only when the integrated signal K reaches a magnitude less than the magnitude of a reference input signal from source 38. The output signal L from the level detector 36 initiates trigger pulses M having a relatively small time duration from the monostable multivibrator 40. The trigger pulses M initiate the gating signal N from the multivibrator 42 which is fed to conventional gating circuitry to initiate an analysis period for the P wave portion of the input waveform. In a specific embodiment, it was desired to initiate gate pulses N, 200 milliseconds before the succeeding $r$ wave at $t_7$. Pulses generator 24 was therefore set to supply 200 millisecond pulses, so that level detector 36, set to respond to a transition beyond zero volts, would trip generators 40 and 42 at the proper phase of the next cycle. Obviously, other settings of the reference level 38 for level detector 36 can be used to select other initiation times anywhere along the slope of wave K between $t_2$ and $t_7$. Other level detectors like 36, 46, and 48 may be fed in parallel from the integrator for independent timing action. The trigger pulses M are also fed to an amplifier 44 in order to provide control signals as hereinafter described.

The output K from the analog summing integrator 32 is simultaneously fed to each of the level detectors 46 and 48, which produce output pulses only upon the occurrence of input voltages having magnitudes greater than reference voltages supplied by the sources 50 and 52. Each of the sources 50 and 52 provides a reference voltage of a different magnitude. The outputs of the level detectors are coupled to respective ones of the NOR gates 54 and 56. The binary signal F from the binary element 22 is utilized to trigger a multivibrator 58 which in turn initiates periods of conduction of multivibrator 60. The output voltage of multivibrator 60 is simultaneously coupled to an input of each of the NOR gates 54 and 56. The resulting outputs from the NOR gates are coupled to respective ones of the binary elements 62 and 64, along with the simultaneous application of pulses from the multivibrator 58.

The outputs of the binary elements 62 and 64 are connected both to conventional indicators (not shown) and also to a NOR gate 65. The NOR gate 65 provides an output for energizing a conventional indicator (not shown) to indicate that the rate of recurrence of the input signal is within a normal range, unless a high output is received from one of the binary elements 62 or 64 indicating an excursion of the rate form the normal range.

FIG. 2 illustrates a portion of the present circuitry which may be utilized to generate timing gates for second and third different recurring voltage levels of the input wave. This portion of the present circuitry may be connected directly to the outputs of the binary element 22 illustrated in FIG. 1. The first binary signal E from the binary element 22 is fed to a monostable multivibrator 66 and to the AND gate 68. The output P of the multivibrator 66 is fed to the AND gate 68, with the resulting gated output Q being coupled to one input of a voltage switch 70. The second binary signal F from the binary element 22 is fed to a multivibrator 72 and to the second input of the voltage switch 70.

The output R from voltage switch 70 is fed into an analog summing integrator 74 comprising a capacitive integrating element. The alternating output voltage S of the integrator is periodically reset to zero by virtue of a reset switch 76 operating in dependency on the output O of the multivibrator 72. The output voltage S of the integrator 74 is directed to one input of a level detector 78, which provides a high level output signal T only when the output voltage S reaches a magnitude less than a reference voltage applied by source 79 to the second input of the level detector. The first binary signal E from the binary element 22 is fed to the monostable multivibrator 80, whose output signals U are directed both to a monostable multivibrator 82 and also to the input of a NOR gate 84. The secondary binary signal F from the binary element 22 is also fed to the input of the NOR gate 84, along with the output T of the level detector 78.

The resulting output V from the NOR gate 84 is utilized by subsequent analyzing circuitry to gate a predetermined recurrent portion of the input wave, the $t$ wave. Further, the output W of the multivibrator 82 is utilized to gate a different recurrent voltage level of the input wave, the $s$-$t$ interval, as will be subsequently described in greater detail. It will be understood that additional recurrent portions of the input can be gated and subsequently analyzed by means of additional circuitry similar to that illustrated in FIGS. 1 and 2, and responsive to the binary signals from the binary element 22.

Referring now to FIG. 3, another portion of the present circuitry is illustrated to determine whether or not the timing gates for the recurrent voltage levels of the input signal have been properly positioned. The first binary signal E from the binary element 22, previously described in reference to FIG. 1, is fed to a monostable multivibrator 86 which operates to generate a short timing pulse of fixed duration initiated with the upward transitions of voltage waveform E. The signal E is also introduced to one input of AND gate 88, with the output of multivibrator 86, to provide output pulses from the gate 88 having a small predetermined initial time delay with respect to the signal E.

The output signal from gate 88 is applied to one input of a voltage switch 90, while a second binary signal F from the binary element 22 is applied to the second input. Voltage switch 90 supplies rectangular output pulses of a first polarity initiated with the delay time defined by monostable multivibrator 86 after zero reference phase determined by the $r$ wave in the first cycle shown in FIG. 8, which switches to zero at $t_0$ for the first cycle shown in FIG. 8.

The output of voltage switch 90 is integrated in analog summing integrator 92. This unit had been reset for zero output voltage by reset switch 94 fed from multivibrator 86, so that its output is zero until the first rectangular waveform from voltage switch 90 is applied to the integrator after $t_0$. Under the applied constant voltage from switch 90, analog summing integrator 92 therefore accumulates a linearly rising voltage whose peak amplitude is a direct function of the duration of the preceding cardiac cycle, with due respect for the slight initial delay imposed by monostable multivibrator 86. Upon occurrence of the next cardiac cycle beginning with the $r$ wave at $t_2$, FIG. 8, voltage switch 90 reverts to a positive output and the output of integrator 96 begins to decline. Thus, if the second cardiac cycle to which the integrator responds, is of substantially the same duration as the immediately preceding cycle, the integrated output will pass just through zero, substantially at the onset of the third cycle with the $r$ wave occurrence at $t_7$, FIG. 8, minus the interval of MMV 86. If, on the other hand, arrhythmia is present, the output of integrator 92 will reach zero either in further advance of $t_7$, or thereafter. The time interval defined between $t_2$ and the moment that the output of integrator 92 transits the zero or reference value, is therefore a direct measure of the duration of the preceding heart cycle according to which the timing gates for the succeeding cycle may have been set, minus a given tolerance. As will subsequently appear, this time measure is employed to determine whether or not the gates are set accurately, and if not, evaluation readings are inhibited, as will be described below.

Level detector 96 receives the output of integrator 92 and a reference potential from source 97. The output of level detector 96 is selected to respond as the integrator output transits the reference level zero in the preferred embodiment, and triggers monostable multivibrator 98 to generate a short pulse, such as 60 milliseconds. The $r$ wave appearing at $t_7$ results in the application of waveform E to monostable multivibrator 100 to provide a short pulse, 2 milliseconds in the preferred embodiment, to NOR gate 102. The system of FIG. 3 essentially responds to time coincidence of the short pulse from monostable multivibrator 100 and the longer pulse from monostable multivibrator 98. The time durations of these pulse generator outputs are so selected that the signals occur in time-overlapping relationship if the gates to the utilization circuits have been set sufficiently accurately for satisfactory evaluation of the respective time intervals of the cycle under analysis. If, however, the gates have not been set satisfactorily, the outputs of generators 100 and 98 will not overlap, and evaluation will be inhibited.

NOR gate 102, for these purposes, receives the outputs of generators 98 and 100. A third input to gate 102 is supplied from the output (M) of amplifier 44 previously described in FIG. 1. The resulting output from NOR gate 102 is utilized in conjunction with the output of amplifier 44 to control the voltage state of binary element 104 to indicate the stability of the input signal recurrence rate. Subsequent disabling circuitry shown in FIG. 7, to be later described, detects the voltage state of the binary element to determine whether the recurrence rate is constant enough to allow accurate gating of the desired recurrent input wave voltage levels. If the rate is substantially irregular, the disabling circuitry disables the analysis outputs.

FIG. 4 illustrates an exemplary circuit which may be used as the level detector in the circuitry previously described, together with a logic table of the circuit operation. The level detector compares a voltage applied at input terminal $a$ against a voltage presented at input terminal $b$ and provides a high or a low binary output signal at terminal $q$ depending upon the relative amplitudes of the two input voltages. Generally, one of the two input voltages is a steady D.C. reference voltage which is representative of a standard wave parameter being evaluated, or the reference voltage may be of a predetermined amplitude or polarity to determine the onset of a signal. It will be understood that different types of transistors could be used, along with a change in the polarity of the biasing voltage.

The input signals applied at terminals a and b are utilized to control the operation of the emitter coupled transistors 106 and 108. A suitable bias is maintained upon the emitters of transistors 106 and 108 by biasing transistor 110. A potentiometer may be connected between the emitters of transistors 106 and 108 in order to adjust the ratio of biasing voltage applied to each of the transistors in accordance with certain desired waveform parameters.

The voltage appearing at the collector of transistor 108 is used to drive the p-n-p transistor 112. The output voltage appearing on the collector of transistor 112 drives transistor 114 whose collector output signal is delivered to the output terminal $q$. The overall sensitivity of the present level detector is determined by the gain provided by transistors 112, 114, 106, and 108.

If a voltage is applied to input terminal $a$ having a magnitude greater than the voltage applied to input terminal $b$, transistor 106 will be saturated and will absorb substantially all the current provided by transistor 110. Transistors 108, 112, and 114 will become nonconductive, and thus a high voltage will be presented at the output terminal $q$. However, if the voltage applied to terminal $b$ is greater in magnitude than the voltage applied at terminal $a$, the transistor 108 will require substantially all the current provided by transistor 110 and the collector voltage of transistor 108 will be lowered sufficiently to throw transistors 112 and 114 into conduction. When the transistor 114 is saturated, the voltage output at terminal $q$ is low.

The level detector thus has four conditions of operation illustrated at the logic table of FIG. 4. First, when a steady reference voltage $Vr$ is applied to input $b$ and an input signal $Vi$ having a magnitude less than $Vr$ is received at terminal $a$, the voltage output at terminal $q$ will be low. In the second mode of operation, if a reference voltage $Vr$ is provided at terminal $b$ and a voltage $Vi$ having a magnitude equal to or greater than $Vr$ is provided at terminal $a$, the voltage output at the $q$ will be high. Thirdly, if a voltage $Vr$ is provided at terminal $a$ and a voltage $Vi$ having a magnitude equal to or less than $Vr$ is presented to terminal $b$, the voltage output at $q$ will be high. Fourth, if a voltage $Vr$ is provided at terminal $a$ and a voltage $Vi$ $Vi$ having a magnitude greater than $Vr$ is presented at terminal $b$, the voltage output at $q$ will be low.

Figure 5:
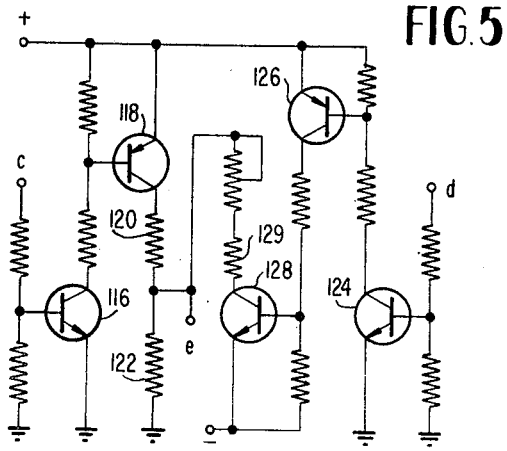
FIG. 5 is a schematic circuit diagram of the voltage switch of the present invention including a logic operation table.

Referring to FIG. 5, exemplary circuitry for a voltage switch suitable for use in the present system is shown, in addition to a logic table illustrating its operation. The voltage switch comprises two inputs $c$ and $d$ and one output designated as $e$. A voltage applied to input $c$ controls the operation of transistor 116 which in turn drives transistor 118 into conduction. The collector voltage from transistor 118 is applied across a voltage dividing network including resistors 120 and 122 in order to determine the positive voltage magnitude of the output $e$. An input signal applied to terminal $d$ controls the operation of interconnected transistors 124 and 126, with the collector output voltage of transistor 126 driving transistor 128. A negative voltage may be applied to output $e$ from transistor 128 across resistor 129.

Referring to the logic table shown in FIG. 5, it will be understood that if a low or zero signal is applied to both inputs $c$ and $d$, all of the transistors in the voltage switch circuit will be cut off and the output $e$ will be zero. Secondly, if a zero or low voltage is applied to terminal $c$, while a high voltage is applied to terminal $d$, a negative voltage having a magnitude dependent upon the voltage divider resistors 122 and 129 will appear at terminal $e$. The low or zero input signal applied to terminal $c$ will cause transistors 116 and 118 to be cut off, while the high voltage signal applied at input terminal $d$ causes transistors 124, 126, and 128 to be saturated.

In the third mode of operation illustrated in the logic table, if a high voltage is applied to input $c$ while a zero or low voltage is applied to terminal $d$, transistors 116 and 118 will be saturated while the three remaining transistors of the circuit will be cut off. A positive voltage output will thus appear at terminal $e$ having a magnitude determined by the voltage dividing resistors 120 and 122. The present voltage switch is so designed that care must always be taken not to simultaneously apply high voltage signals to both of input terminals $c$ and $d$ simultaneously.

Figure 6:
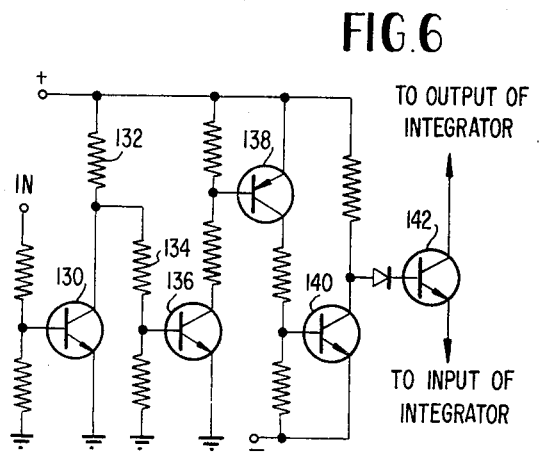
FIG. 6 is a schematic diagram of a reset switch along with a logic operation table.

Considering FIG. 6, the reset switch utilized in the present system is illustrated in schematic detail, in addition to a table illustrating the logic operation of the circuit. The reset switch is controlled by a voltage applied to the base of a transistor 130 through the input terminal. The transistor 130 is connected between ground and an intermediate point of a voltage dividing network comprising resistors 132 and 134. Current is normally supplied to the base of a transistor 136 through resistor 134, and transistors 138 and 140 are normally driven into conduction by virtue of the conductivity of transistor 136.

When transistor 140 is conductive, a high negative voltage appears at its collector and essentially no current flows to the base of the normally nonconductive transistor 142. The collector of transistor 142 is connected to the output of an integrator (not shown), while the emitter of transistor 142 is applied to the integrator input. Since transistor 142 is normally in a nonconductive state, the transistor presents an apparent high resistance across the input and the output of the integrator and the integrator operates normally.

However, as illustrated in the logic table shown in FIG. 6, if a high voltage is applied to the input terminal of the reset switch, transistor 130 saturates and cuts off transistors 136, 138 and 140. The collector of transistor 140 will thus provide a positive voltage to the base of transistor 142, saturating transistor 142. An apparent low resistance presented by the transistor 142 provides a feedback loop between the output and the input of the integrator (not shown), resetting the output of the integrator to zero by discharging the voltage across the capacitive elements of the integrator.

Figure 7:
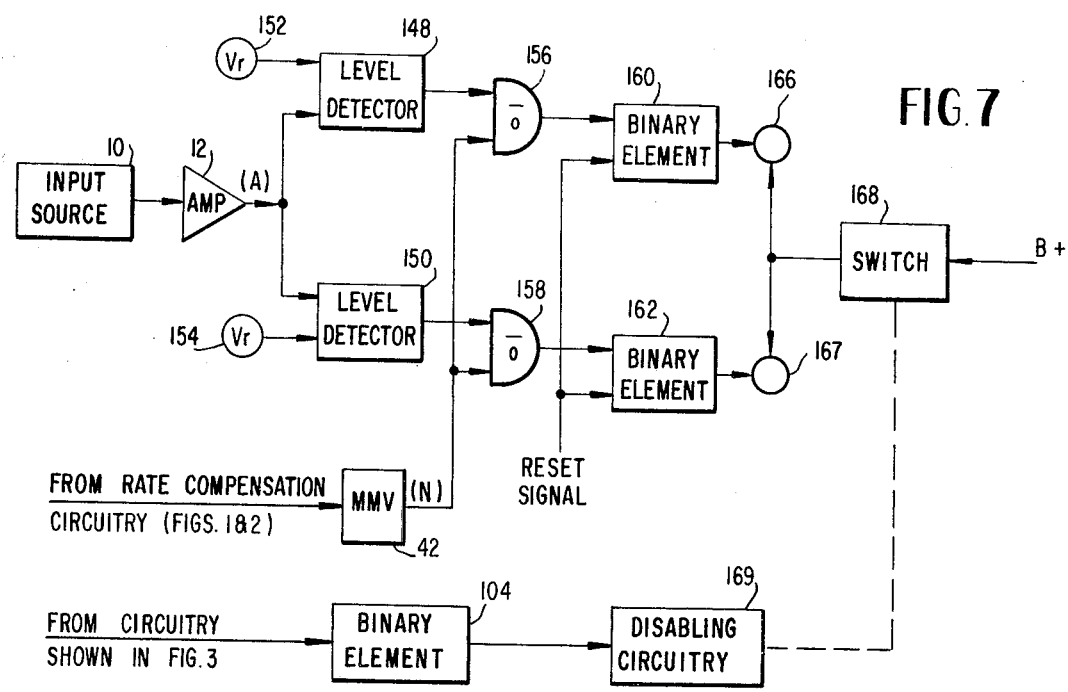
FIG. 7 is a block diagram of a portion of an exemplary electrocardiac signal analysis system utilizing the present rate compensation invention to perform a gating function.

FIG. 7, for illustrative purposes, shows an elementary version of $p$ wave analysis circuitry. More detailed analysis would usually be accomplished, such as by use of the networks disclosed in FIG. 15 of the previously mentioned co-pending application, Ser. No. 500,122. As disclosed in the co-pending application, the various recurrent portions of an electrocardiac wave may be individually segregated for measurement and indication by means of the various timing gate signals generated in response to one recurrent portion of the waveform, such as the $r$ wave. More specifically, timing gate signals generated at predetermined phases with respect to the occurrence of an $r$ wave may be utilized to gate the electrocardiac wave only during the occurrence of selected recurrent portions, such as the $t$ waves. As shown in FIG. 1 of the copending application, other timing gate signals may be generated at different phases relative to the $r$ wave in order to gate other recurrent portions of electrocardiac signals, such as the $p$ wave, $s$-$t$ interval, and the like.

The co-pending application further discloses that separate analysis and indication circuits may be provided for each of the electrocardiac signal portions to be analyzed, so that separate indications of the normality of each signal portion may be presented. To compensate the analysis of each recurrent electrocardiac signal portion for changes in the patient's cardiac rate, the copending application utilizes "running average" circuitry, previously discussed. This circuitry changes the absolute time durations of the timing gate signals in response to variances in the average cardiac rate.

As shown in FIG. 7, the improved cardiac rate compensation circuitry of the present invention may be advantageously incorporated in an electrocardiac signal analysis system similar to that disclosed in the co-pending application. In order to clearly illustrate the operation of the present rate compensation system with such an electrocardiac asystem, the output waveform N provided by the multivibrator 42 in FIG. 1 is utilized to perform a gating function in the $p$ wave analysis circuitry disclosed in the co-pending application.

It will, of course, be understood that other timing gate signals provided by the present invention can be utilized to perform gating functions in the various other analysis systems disclosed in the co-pending application. For instance, the waveform W provided by the gating multivibrator 82 can be utilized to gate the $s$-$t$ interval wave analysis system such as the one disclosed in FIG. 12 of the co-pending application. Similarly, the waveform V of the present invention can be utilized as a gating signal for $t$ wave analysis circuitry similar to the circuitry disclosed in FIG. 13 of the co-pending application.

Referring now to FIG. 7, the input source 10, previously described with reference to FIG. 1, provides electrical signals representative of a patient's heart activity to signal amplifying circuitry 12. The amplified signal is then applied to an input of both the level detector 148 and the level detector 150.

Reference voltages are applied to the second inputs of the level detectors by reference voltage sources 152 and 154. Each of the level detectors 148 and 150 produces an output pulse only when the electrocardiac signal amplitude reaches a predetermined magnitude with respect to the reference voltages, and this output is applied to an input of the respective NAND gates 156 and 158. The outputs of the NAND gates are fed to respective binary elements 160 and 162.

The gating output N of the $p$ wave rate compensation circuitry, described in detail with reference to FIG. 1, is applied from the multivibrator 42 to a second input of both NAND gates 156 and 158 in order to gate the desired $p$ wave portions of the electrocardiac wave. The binary elements 160 and 162 are periodically reset to a low state during alternate, non-gated cycles of the electrocardiac waveform by a suitable reset signal, such as the signal M from amplifier 44, shown in FIG. 1. The outputs of the binary elements 160 and 162 are applied to suitable indicating devices 166 and 167, which may be transistor driven lamps.

The indicating devices 166 and 167 are energized by a D.C. voltage applied from a suitable source. This D.C. voltage may be selectively interrupted by the opening of the normally closed switch 168 in response to a signal from the disabling circuitry 169. The disabling circuitry 169 is operated in dependency on the state of the binary element 104, described with reference to FIG. 3, in order to disable the indicating devices 166 and 167 upon the occurrence of too wide variation in the cardiac period of the patient. The disabling circuitry may comprise, for instance, a transistor driven mechanical relay. An indication device, not shown, may be connected to the disabling circuitry to prevent a false reading of the indicating circuitry of certain analysis systems. When the disabling circuitry is activated, the indication device is deenergized so that no readings will be taken during that heat evaluation cycle. The detailed operation of the circuit of FIG. 7 is described below.

SYSTEM OPERATION

Figure 8:
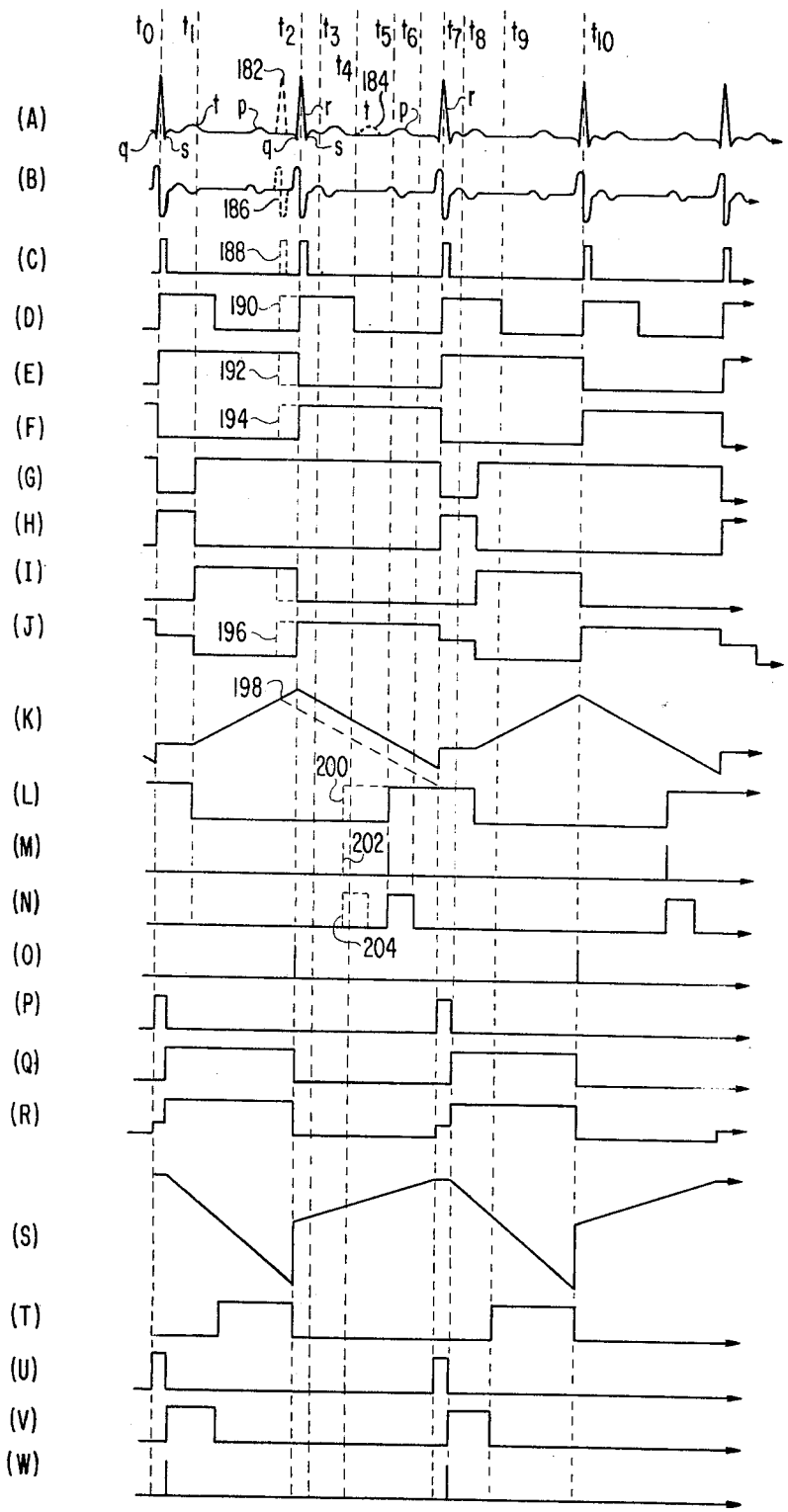
FIG. 8 is a diagram of waveforms of the system circuitry showing in solid line an assumed heart rate, and in dotted line an illustrative variation.

The operation of the present system may be best understood by reference to the circuitry shown in FIG. 1 and the series of waveforms illustrated in FIG. 8. The illustrated waveforms are identified by like letters utilized in FIG. 1. For clarity of description, the operation of the present system will be described in connection with selectively gating predetermined portions of an electrocardiac wave generated by electrodes placed upon the body of a patient. However, waveforms from other sources, such as those previously mentioned, may be also selectively gated with the present system.

Electrocardiac waveforms generally assume a configuration illustrated in FIG. 8A comprising a number of recurrent voltage levels. As is well known, each recurrent interval of the electrocardiac waveform generally will be initiated by a voltage waveform termed a $p$ wave followed by a $qrs$ complex, comprising any one or more of a negative voltage level $q$, a high positive voltage level or peak $r$, and a subsequent negative voltage level $s$. A first low voltage level interval will follow, commonly termed the $s$-$t$ interval. A moderately high positive voltage level termed a $t$ wave will follow the $s$-$t$ interval, and in turn will be followed by a second low voltage level termed the $t$-$p$ interval. Any component or combination of components of the cardiac waveform may be absent in a given lead configuration. The waveform of FIG. 8A is representative of the electrocardiac signal. The general pattern of the successive wave characteristics is preserved in successive cycles, although the average heart rate may vary widely, and the period may change from one cycle to the next when arrhythmia is present.

FIG. 1 shows circuitry for gating alternate ones of electrocardiac $p$ waves even during widely varying cardiac rates. The electrocardiac waveform is amplified by the amplifier 12 to provide the amplified signal of FIG. 8A. The signal is differentiated by the analog differentiator 14, as illustrated in FIG. 8B, to enable accurate triggering of subsequent circuitry by the peak voltage of the $r$ waves. The level detector 16 compares the differentiated wave with a negative reference voltage of approximately 5 volts, and produces an output pulse only when the negative peaks of the differentiated voltage exceed the reference voltage magnitude. The waveform illustrated in FIG. 8C is thus produced, providing a positive trigger pulse representative of a zero reference phase in response to each occurrence of the electrocardiac $r$ wave.

The trigger pulses supplied by the level detector 16 are applied to the monostable multivibrator 20, which operates in dependency on the rate of recurrence of the trigger pulses to generate the pulses of FIG. 8D. The pulses D have durations of approximately 300 milliseconds and are fed to the input of the binary element 22. The binary element 22 is of a conventional design which produces a pair of first pulse trains E and F, each alternating between two voltage states of opposite polarities in response to the leading edges of the pulses 8D. As illustrated in FIG. 8E and 8F, the pulse trains E and F always are of opposite polarity, with each pulse train changing voltage states upon the occurrence of an $r$ wave peak of the electrocardiac signal.

The pulse train E is applied to the input of the monostable multivibrator 24 which initiates a second pair of pulse trains G and H. Both the negative pulse train G and the positive pulse train H comprise pulses having durations of 200 milliseconds and generated in response to the leading edges of the pulse train E, as illustrated in FIGS. 8G and 8H. The duration of these pulses may be varied in dependency on different environments and different desired gating parameters, but a duration of approximately 200 milliseconds has been found to represent a standard time interval between adjacent $r$ and $p$ waves to provide accurate gating.

The negative pulse train G from the monostable multivibrator 24 is applied to one input of the AND gate 26, with the binary signal E from the binary element 22 being applied to the second input of gate 26. As the AND gate 26 provides an output having a voltage magnitude equal to the lowest voltage level of its two inputs, a gated waveform, illustrated in FIG. 8I, is provided. The waveform I is provided to one input of the voltage switch 30, while the second binary signal F of the binary element 22 is directly applied to the second input of the voltage switch 30. In a manner previously described with reference to FIG. 5, the voltage switch provides a waveform illustrated in FIG. 8J, wherein the voltage level of the waveform is zero from $t_0$–$t_1$ when both inputs F and I are low, the waveform having a negative voltage level from $t_1$–$t_2$ when input F is low and input I is high, and the waveform having a high positive voltage from $t_2$–$t_7$ when input F is high and input I is low.

The waveform J from the voltage switch 30 is then applied to the input of analog summing integrator 32, which institutes a linear timing process by integrating the waveform J during the time intervals $t_1$–$t_2$ to provide a first substantially linear portion having a positive slope, as illustrated in FIG. 8K. The integrator 32 also integrates waveform J to reverse the linear timing process at the zero phase of the next cycle by providing a second substantially linear portion having an opposite negative slope during the interval $t_2$–$t_7$.

The positive pulse train H from the multivibrator 24 is applied to the input of the reset switch 34, which operates in a manner described in detail with reference to FIG. 6 in order to reset the output voltage of integrator 32 to zero upon the occurrence of each positive voltage level of the pulse train H. As illustrated in FIG. 8K, the output voltage of the integrator is thus reset substantially instantaneously to zero upon the occurrence of alternating $r$ wave peaks at $t_0$ and $t_7$. As the waveform J is also set at zero voltage level during the time interval $t_0$–$t_1$, the first substantially linear portion starts from a reference voltage of zero when the reset shunt is removed from the integrator 32. The positive-going substantially linear portion of waveform K rises to a maximum terminal voltage at $t_2$, wherein the voltage level of the waveform J becomes positive and the integrated output from the integrator 32 becomes a second substantially linear portion having a negative slope.

By an inspection of the waveform shown in FIG. 8K, it will be seen that the output signal of the integrator reaches zero at the time $t_5$. As the high and low voltage levels of the waveform J are of equal magnitudes but of opposite polarities, the time required for the integrated output to rise from the reference voltage zero at $t_1$ to a positive terminal voltage at $t_2$ will be equal to the time required for the integrated output to fall from the terminal voltage at $t_2$ to the reference zero volts at $t_5$. As the initiation of the integrated first substantially linear portion was delayed for the standard time interval of 200 milliseconds from $t_0$–$t_1$, the second substantially linear portion will cross the reference zero voltage at exactly 200 milliseconds before the next expected occurrence of the $r$ wave at $t_7$.

The level detector 36 compares the integrated output K with a substantially zero voltage reference signal in order to produce the waveform illustrated in FIG. 8L having a high positive voltage only when the integrated waveform falls below the zero reference. The output pulses L from the level detector 36 are applied to the monostable multivibrator 40 which generates a series of positive trigger pulses M upon the occurrences of the leading edges of the level detector pulses.

The trigger pulses M of multivibrator 40 shown in FIG. 8M are utilized to trigger $p$ wave gating pulses N from the gating signal multivibrator 42. The gating pulses N are of a predetermined time duration, such as 150 milliseconds, which is a duration sufficient to encompass the duration of the normally occurring $p$ wave from $t_5$–$t_6$. The trigger pulses M are also amplified by amplifier 44 for utilization in the circuitry of FIG. 3, as will be hereinafter described.

The present invention thus provides a technique which may be utilized to generate gating pulses for the expected occurrence of alternating $p$ waves of an electrocardiac waveform, even though the present system is triggered off the peaks of $r$ waves. It will be understood that the electrocardiac wave illustrated in the present example has a substantially constant rate of recurrence, and therefore the gating pulses N occur substantially coextensively with alternating $p$ waves, allowing for a normal variation. However, if the rate of recurrence suddenly widely varies, the estimated time of arrival of alternating ones of the $p$ waves might be considerably in error. The rate responsive device illustrated in FIG. 3 is thus utilized to inhibit indications of the $p$ waves during the occurrence of highly erratic signals, as will be described in greater detail.

The present system provides accurate gating of predetermined portions of a waveform during varying rates of recurrence. This may be best illustrated by assuming that the patient's cardiac rate increases during the time interval $t_0$–$t_2$ so that the $r$ wave shown at $t_2$ actually occurs earlier, as shown in dotted lines designated 182 in FIG. 8A. It will also be assumed that the $p$ wave following the early arriving $r$ wave 182 is displaced in time, as shown in dotted lines designated 184.

As the $r$ wave is utilized to trigger the timing intervals of the present invention, the early arriving $r$ wave 182 initiates a succession of time-displaced waves, including differentiated wave 186 (FIG. 8B), level-detected wave 188 (FIG. 8C), and pulse 190 (FIG. 8D). The binary element 22 thus terminates the waveform 8E at 192 and initiates waveform 8F at 194. As a result, the voltage switch 30 terminates the output wave 8J at 196 and the integration 32 reverses its timing process early, as designated at 198.

The level detector 36 senses a zero crossing of the integrated wave at 200, thus causing the multivibrators 40 and 42 to initiate timing pulses at 202 and 204. As seen from an inspection of FIGS. 8A and 8N, the gating pulse 204 occurs generally coextensively with the early arriving $p$ wave 184. Of course, if portions of the $p$ wave 184 and gating pulse 204 had not occurred coextensively, the circuitry described with reference to FIGS. 3 and 7 will disable all indicating circuits for that cycle. It will be understood that a late arrival of the $r$ wave would cause the timing circuitry of the present invention to delay the generation of a $p$ wave gate in a manner similar to that previously described.

Referring again to FIG. 1 and the normal electrocardiac wave shown in FIG. 8A, the integrated voltage K is fed to one input of each of the level detectors 46 and 48 in order to indicate the relative cardiac rate. Reference voltages having predetermined magnitudes are also provided for each of the level detectors. As the amplitude of the integrated signal K is inversely proportional to the cardiac rate, an indication of the cardiac rate may be provided by sensing the magnitude of the integrated signal at predetermined times. For instance, the reference voltage applied to the level detectors 46 by source 50 may be set at a relatively high level, such as +3.5 volts, which will be obtained by the integrated signal K only when the cardiac rate reaches a certain low rate. The reference voltage applied to the level detector 48 may then be set at a relatively low value, such as 1.2 volts, which the integrated signal K will normally reach unless the cardiac rate is at a predetermined high.

If the cardiac rate thus produces an integrated signal K which reaches a magnitude between the reference voltage levels applied to level detectors 46 and 48, NOR gate 54 will provide a high output signal, while the NOR gate 56 will provide a low output. The outputs of the NOR gates are connected to the inputs of the binary elements 62 and 64 in such a manner that low binary outputs are produced by both of the elements during normal cardiac rates. During normal cardiac rates, the NOR gate 65 thus provides a high output signal which may be utilized to energize suitable indication circuitry.

However, assuming that the cardiac rate drops below a predetermined level, the integrated signal K will rise to a magnitude greater than the reference voltage applied to the level detector 46, thus causing a high binary output from the NOR gate 54 and subsequently causing a high binary output from the binary element 62. Suitable indication circuitry thus indicates an excursion of the cardiac rate below the selected rate level. As a result of the high voltage output from the binary 62, the NOR gate 65 will produce a low binary output.

Assuming a high cardiac rate, the integrated signal K will not reach a voltage magnitude sufficient to produce a high output signal from the level detector 48, thus causing a high binary output from the NOR gate 56, and a subsequent high binary output from the binary element 64. NOR gate 65 will be switched to a low binary output and suitable indication circuitry will indicate the high cardiac rate.

The second biary output signal F from the binary element 22 is fed to the input of the monostable multivibrator 58, which produces output pulses of relatively short duration which are used to reset the previously described binary elements 62 and 64 to a low output at a predetermined time during alternate cardiac cycles. The output pulses from the multivibrator 60 are used to gate the rate indicating binaries 62 and 64 after a slight time delay via the NOR gates 54 and 56.

The operation of the circuitry illustrated in FIG. 2 may be best understood by reference to the waveforms of FIGS. 8O–8W The first binary signals E from the binary element 22 (FIG. 1) are fed to the input of the monostable multivibrator 66 to produce relatively short duration positive pulses P in time dependency on alternating ones of the electrocardiac $r$ waves. The signals E and the pulses P are fed to the inputs of the AND gate 68, which produces the output shown in FIG. 8Q.

The second binary signal F from the binary element 22 is fed to an input of the voltage switch 70 along with the waveform Q, in order to generate the waveform illustrated in FIG. 8R. Waveform R thus alternates between a first negative voltage state occurring during the time interval $t_2$–$t_7$, a zero voltage level existing approximately during the time interval $t_7$–$t_8$, and a high positive voltage level existing approximately during the time duration $t_8$–$t_{10}$.

The waveform R is fed to the input of the analog summing integrator 74, which produces an integrated output S having a first substantially linear portion occurring during $t_2$–$t_7$, and a second substantially linear portion occurring during the approximate interval $t_8$–$t_{10}$. The second binary signal F from the binary element 22 is also fed to the input of the monostable multivibrator 72 in order to produce voltage spikes O upon the occurrence of alternating ones of the electrocardiac $r$ waves. These voltage spikes are fed into the input of the reset switch 76 in order to reset the integrated output S of the integrator 74 to a reference zero voltage. The integrator 74 is thus reset to zero at time $t_2$, integrates the negative voltage level of waveform R to provide a terminal voltage at $t_7$, and is held at the terminal voltage until just before $t_8$. The second substantially linear portion is then initiated in order to fall until it passes through the zero reference voltage at $t_9$.

The integrated waveform S is fed to an input of the level detector 78, which provides a high voltage output only when the integrated voltage level drops below zero in order to produce the pulse train T, as illustrated in FIG. 8T. This pulse train is fed to one of the inputs of the NOR gate 84, along with the second binary output signal F from the binary element 22. The first binary signal E from the binary element 22 is applied to the input of the monostable multivibrator 80 in order to produce a series of pulses U having selected time durations, such as approximately 80 milliseconds. This interval could be extended up to approximately 110 milliseconds by the application of an outside control voltage, if desired.

The series of pulses U are applied to an input of the NOR gate 84 to generate the series of electrocardiac $t$ wave capturing gates V. Monostable multivibrator 80 also directs the series of pulses U to the input of the monostable multivibrator 82 in order to generate trigger pulses W for controlling the position of the $s$-$t$ interval gating pulses.

It will thus be understood that the circuitry illustrated in FIG. 2 operates in a similar manner to the circuitry of FIG. 1, wherein the time duration between two successive $r$ waves of the electrocardiac cycle is sensed and utilized to initiate a gate for the next expected occurence of the $t$ wave. The durations and magnitudes of the waveforms produced in the present circuitry may, of course, be adjusted to change the relative position of the timing gate to the $r$ waves of the cardiac cycle in order to gate such waves as the $q$ or $s$ waves in addition to other low voltage level intervals, such as the $t$-$p$ interval.

The circuitry illustrated in FIG. 3 is connected to the present system in order to inhibit the gating of the electrocardiac waveform during variations in cardiac rate beyond preselected upper and lower limits. The circuitry operates in a manner very similar to the circuitry previously described in order to determine whether or not the timing gates have been properly positioned. In a manner made obvious by the previous discussion of the circuitry of FIG. 1, the analog summing integrator 92 produces an integrated waveform having a shape somewhat similar to that illustrated in FIG. 8K. The level detector 96 produces a high output voltage only when the integrated voltage drops below a reference of zero volts, and drives the monostable multivibrator 98 to produce a signal which is initiated prior to the expected occurrence of alternating $r$ waves.

The first binary signal E from the binary element 22 is applied to the input of the monostable multivibrator 100 in order to initiate the generation of short duration voltage pulses upon the actual occurrence of peak $r$ waves. Output signals from the multivibrators 98 and 100 are logically summed, or compared, by the NOR gate 102 in order to set the binary element 104 high only if multivibrator 100 is triggered into conduction during the time that the output of multivibrator 98 is high. The output durations of the pulses produced by the multivibrators 98 and 100 are such that portions of the pulses will be coextensive only if the cardiac rate is substantially within a stable range.

If the cardiac rate has varied instantaneously such that the monostable multivibrator 100 is triggered into conduction, either before or after the period of conduction of the monostable multivibrator 98, the binary element 104 will remain low. The output of the binary element 104 may thus be utilized to inhibit the display of the present system if the cardiac rate becomes excessively erratic, as described with reference to FIG. 7. The output from the amplifier 44 from FIG. 1 is applied to both the inputs of the NOR gate 102 and binary element 104 in order to reset the indication of the binary element for alternating cycles of the cardiac rate.

Operation of the present rate compensation circuitry in an electrocardiac signal screening system similar to that disclosed in the previously mentioned co-pending application may be understood by reference to FIG. 7. As previously described, an amplified electrocardiac waveform is applied from the amplifier 12 to inputs of level detectors 148 and 150. Preselected reference voltages representative of clinical standards are provided to the second inputs of the detectors 148 and 150. Gating pulses, in this case, $p$ wave gating pulses, are applied from the multivibrator 42 to inputs of the gates 156 and 158. As noted above, FIG. 7 shows simplified $p$ wave analysis circuitry for purposes of illustration.

If the electrocardiac signal level is greater than the voltage level supplied by source 152 during the $p$ wave gating signal from multivibrator 42, the output of the NAND gate 156 will be set high, while the NAND gate 158 output will be set low. The output of binary element 160 will thus be set high, while the output of binary element 162 will remain low. Only the indicator 166 will be energized, indicating an elevated amplitude for that p wave.

In a somewhat similar manner, if the electrocardiac signal amplitude is below the signal provided by source 154 during a gated p wave, only the indicator 167 will be energized. It will be understood that a plurality of similar analysis circuitry would be connected to the amplifier 12 to comprise a total system.

If the cardiac period changes so that a particular p wave gating pulse is not properly placed, the resulting low output of the binary element 104, described in detail with reference to FIG. 3, is sensed by the disabling circuitry 169. The normally closed switch 168 is then opened, disrupting the supply of D.C. bias voltage to indicators 166 and 167 to prevent the display of false data.

It will thus be understood that the present system enables selective gating of portions of a recurrent input waveform having varying periods, or of waveforms having widely differing repetition rates. As waveforms such as electrocardiac waves may vary widely over a wide range of repetition rates, from, for example, below 40 to above 140 recurrences per minute, the present apparatus has been found to substantially improve results in the electrocardiac screening of a large number of patients. Further, the present system may respond to moderate cardiac arrhythmias and sudden changes in the heart rate, as well as inhibiting analysis of waveforms when the cardiac rate is excessively erratic.

While a preferred embodiment has been described for the invention, the invention need not be limited to the exact method described and apparatus illustrated, and it should be understood that modifications which do not depart from the essence of the invention are obvious to those skilled in the art.

Having thus described the invention, I claim:

1. The method of timing a selected cycle of a variably recurrent wave having identifiable reference phase values comprising:
   initiating generation of a first signal in predetermined time relation to the reference phase of the preceding cycle, said first signal changing uniquely as a predetermined function of time from its initiation until occurrence of the reference phase of said one cycle whereupon said signal has a first reference value dependent on the duration of said preceding cycle,
   initiating generation of a second signal in predetermined time relation to the reference phase of said selected cycle at an initial value having a predetermined relation to said first reference value and changing uniquely as a predetermined function of time from its initial value, and
   generating a first time reference signal pertinent to said selected cycle when said second signal reaches a predetermined value.

2. The method of claim 1 further including generating the second signal reversely uniquely with time to the first signal.

3. The method of claim 1 further including resetting the first signal to its previous initial value at the end of said selected cycle.

4. The method of claim 1 further including generating a control signal in dependency on the value reached by the first signal.

5. The method of claim 1 further including generating a third signal in dependency on the ratio of the durations of the preceding cycle and said selected cycle.

6. The method of claim 1 further including delaying generation of the first signal a predetermined period after the reference phase of the preceding cycle.

7. The method of claim 1 further including generating the first time reference signal when the second signal reaches the initial value at which the first signal was generated.

8. The method of claim 1 further including generating a second time reference signal at the end of said selected cycle, and
   comparing the time displacement between the first and second time reference signals.

9. The method of claim 1 further including gating a predetermined wave portion of said selected cycle in dependency on the first timing signal, and
   electrically measuring the gated wave portion to produce a resultant signal.

10. The method of claim 9 further including generating a third signal in dependency on the ratio of the durations of the preceding cycle and said selected cycle, and
    utilizing the resultant signal only if the ratio of durations lies in a selected range.

11. The method of claim 1 further including generating the first and second signals by integrating rectangular pulses.

12. The method of claim 11 further including generating the second signal reversely uniquely with time to the first signal.

13. The method of claim 12 further including generating the first and second signals as voltages varying substantially linearly with time.

14. The method of claim 13 further including generating the first and second signals across a common impedance.

15. The method of claim 14 further including resetting the voltage across the common impedance at the end of said selected cycle to the same value it had at initiation of the preceding cycle.

16. The method of claim 15 further including initiating generation of the first signal from a starting value of zero volts across the common impedance.

17. The method of claim 16 further including generating the first time reference signal when the second signal reaches substantially zero volts across the common impedance.

18. The method of claim 17 further including delaying generation of the first signal a predetermined reference period after the reference phase of the preceding cycle.

19. Apparatus for timing a selected cycle of a variably recurrent wave having identifiable reference phase values comprising:
    first means responsive to said wave to initiate generation of a first signal in predetermined time relation to the reference phase of the preceding cycle, said first signal changing uniquely as a predetermined function of time from its initiation until occurrence of the reference phase of the said one cycle whereupon said signal has a first reference value dependent on the duration of said preceding cycle,
    second means responsive to said wave to initiate generation of a second signal in predetermined time relation to the reference phase of said selected cycle at an initial value having a predetermined relation to said first reference value and changing uniquely as a predetermined function of time from its initial value, and
    third means responsive to the second signal to generate a first time reference signal pertinent to said selected cycle when said second signal reaches a predetermined value.

20. The apparatus of claim 19 wherein the second means further comprises means for generating the second signal reversely uniquely with time to the first signal.

21. The apparatus of claim 19 further comprising means for resetting the first signal to its previous initial value at the end of the selected cycle.

22. The apparatus of claim 19 further comprising means responsive to the first signal for generating a control signal in dependency on the value reached by the first signal.

23. The apparatus of claim 19 further comprising means responsive to the first and second signals for generating a third signal in dependency on the ratio of the durations of the preceding cycle and said selected cycle.

24. The apparatus of claim 19 wherein the first means further comprises time delay means for delaying generation of the first signal a predetermined period after the reference phase of the preceding cycle.

25. The apparatus of claim 24 wherein the third means further comprises means responsive to the second signal to generate the first time reference signal when the second signal reaches the initial value at which the first signal was generated.

26. The apparatus of claim 19 further comprising means responsive to said wave to generate a second time reference signal at the end of said selected cycle, and
    means comparing the time displacement between the first and second time reference signals.

27. The apparatus of claim 19 further comprising gating means responsive to the first time reference signal for gating a predetermined wave portion of said selected cycle, and
    circuit means operative to electrically measure the gated wave portion to produce a resultant signal.

28. The apparatus of claim 27 further comprising comparison means for generating a third signal responsively to the wave operative in dependency on the ratio of the durations of the preceding cycle and said selected cycle, and
    control means responsive to the comparison means operative to effect utilization of the resultant signal only if the ratio of durations lies in a selected range.

29. The apparatus of claim 28 wherein the comparison means further comprises fourth and fifth means respectively identical to the first and second above means and respectively generating fourth and fifth signals, and the control means is responsive to a predetermined value of the fifth signal.

30. The apparatus of claim 19 wherein the first and second means further comprise rectangular pulse generator means and integrator means responsive thereto for integrating said pulses.

31. The apparatus of claim 30 wherein the pulse generator means and the integrator means further comprise means to generate the second signal reversely uniquely with time to the first signal.

32. The apparatus of claim 31 wherein the pulse generator means and the integrating means further comprise means to generate the first and second signals as voltages varying substantially linearly with time.

33. The apparatus of claim 32 wherein the integrator means further comprises a common impedance across which the first and second signals are generated.

34. The apparatus of claim 33 further comprising means for resetting the signal voltage across the common impedance at the end of said selected cycle to the same value it had at the initiation of the preceding cycle.

35. The apparatus of claim 34 wherein the resetting means further comprises means operative to initiate generation of the first signal from starting value of zero volts across the common impedance.

36. The apparatus of claim 35 wherein the third means further comprises means operative to generate the first time reference signal when the second signal reaches substantially zero volts across the common impedance.

37. The apparatus of claim 36 wherein the first means further comprises means delaying the generation of the first signal a predetermined reference period after the reference phase of the preceding cycle.

References Cited

UNITED STATES PATENTS

| | | | |
|---|---|---|---|
| 2,878,448 | 3/1959 | Maxey. | |
| 3,013,208 | 12/1961 | Voznak. | |
| 3,175,161 | 3/1965 | Hackborn et al. | |
| 3,267,933 | 8/1966 | Mills et al. | 128—2.06 |
| 3,351,939 | 11/1967 | Olsen et al. | |
| 3,352,300 | 11/1967 | Rose | 128—2.06 |

ALFRED E. SMITH, Primary Examiner

U.S. Cl. X.R.

128—2.06

UNITED STATES PATENT OFFICE
CERTIFICATE OF CORRECTION

Patent No. 3,510,765         Dated May 5, 1970

Inventor(s) L. R. Baessler

It is certified that error appears in the above-identified patent and that said Letters Patent are hereby corrected as shown below:

IN THE SPECIFICATION:

Column 4, line 16, "privides" should be -- provides --;

Column 7, line 46, "provided at" should be -- connected to --;

Column 7, line 46, delete "Vi";

Column 8, line 51, insert -- the development of -- before "the various timing gate signals";

Column 9, line 5, "asystem" should be -- system --;

Column 9, line 63, "heat" should be -- heart --;

Column 13, line 14, "biary" should be -- binary --.

SIGNED AND
SEALED
SEP 22 1970

(SEAL)
Attest:

Edward M. Fletcher, Jr.
Attesting Officer

WILLIAM E. SCHUYLER, JR.
Commissioner of Patents